Aug. 21, 1962     D. D. MESSMER     3,050,356
FISHING TACKLE BOX

Filed Jan. 11, 1960     4 Sheets—Sheet 1

INVENTOR.
DONALD D. MESSMER

INVENTOR.
DONALD D. MESSMER

Aug. 21, 1962  D. D. MESSMER  3,050,356
FISHING TACKLE BOX

Filed Jan. 11, 1960  4 Sheets-Sheet 3

INVENTOR.
DONALD D. MESSMER
BY

Aug. 21, 1962     D. D. MESSMER     3,050,356
FISHING TACKLE BOX

Filed Jan. 11, 1960                                            4 Sheets-Sheet 4

INVENTOR.
DONALD D. MESSMER,
BY
ATTY

United States Patent Office 3,050,356
Patented Aug. 21, 1962

3,050,356
FISHING TACKLE BOX
Donald D. Messmer, Bay Village, Ohio
(19331 Purnell Ave., Rocky River 16, Ohio)
Filed Jan. 11, 1960, Ser. No. 1,490
2 Claims. (Cl. 312—201)

This invention relates to containers, and, more specifically, to containers having a plurality of easily accessible compartments suitable for holding a wide variety of articles such as fishing tackle, tools, or articles of toilet-kit or the like.

The invention is particularly concerned with the provision of containers of the type described which may be conveniently used, and which are rugged, durable, and economical to manufacture. According to the invention, these containers are formed from a pair of symmetrical, separable sections, either of which can be carried about and opened for individual use, and which are constructed so that they may be firmly secured together to form a single composite unit. Preferably corresponding walls of the two sections are provided with hooks so that the separated sections may be suspended from a support accessible with the compartments in a horizontal plane. As an illustration of such a container, the invention is disclosed as being in the form of a fishing tackle box, since these boxes inherently encounter in their use the many difficulties and inconveniences which are overcome by this invention; however, it is to be understood that the invention is not limited to fishing tackle box construction, and that it is equally applicable to the construction of other containers.

An annoying problem which is inherent in most conventional containers of the type described is the disposition of such boxes when being used. This problem is made manifest in the use of fishing tackle boxes in a boat since, because of the unitary construction and shape of the fishing tackle boxes heretofore known, it has been necessary to either place the box on the bottom of the boat or on a seat. If the boxes are placed on a seat, they frequently are knocked over causing the contents to be either spilled out or hopelessly jumbled in the bottom of the box. The same problem arises if the boxes are placed on the bottom of the boat since in this position they are susceptible of being upset by movements of the fisherman. Another disadvantage of placing the boxes on the floor of the boat is that the contents are relatively inaccessible to the user. Hence, the fisherman is required to repeatedly bend over and open the box to remove the desired article and then close the box and finally replace it in an out-of-the-way position.

This invention eliminates such difficulties and disadvantages by providing a uniquely constructed fishing tackle box unit which is formed from two detachable sections. Latching means are provided so that the sections can be securely and conveniently detachably connected together and carried about by the user as a unitary structure. When the tackle box is used in a boat, the sections may be separated to form individual container units which can be suspended from the gunnel and held in a vertical plane within the boat. In this position the contents of the box are readily accessible to the fisherman, and, at the same time, the location is one in which the box will not interfere with the movements of the fisherman.

Objectives of the invention include the provision of a versatile, sectional container or carrying case which is rugged and durable and inexpensive to manufacture.

Another object of the invention is to provide a container which is formed of separable units or sections, each section being capable of being used separately and individually, and which can be fastened together in a facile manner to form a composite unit.

More specifically, it is an object to provide containers such as a fishing tackle box or the like comprised of two symmetrical sections which can either be detachably secured together and used as a unit, or which can be separately used as individual containers, and which include hooks and positioning means foldably hinged to corresponding walls of each section. When the sections are assembled together, the construction is such that the hooks will be folded against the walls and hidden from view; however, when the sections are detached, the hooks can be swung to a position where the sections can be individually suspended from a support, such as a gunnel of a boat, and positioned and held in a vertical plane.

Another specific object is to provide for securely clamping the hooks and positioning means to the gunnel of a boat.

Other objectives and attendant advantages of the invention will become apparent as the same becomes better understood when considered in connection with the following detailed description and accompanying drawings wherein.

Figure 1:
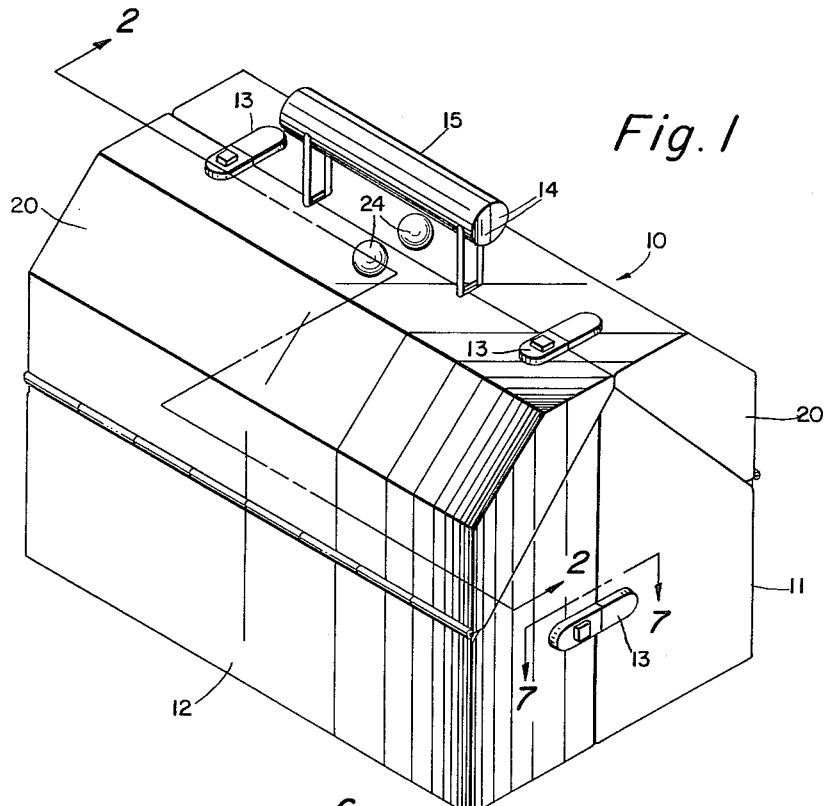
FIGURE 1 is a perspective view of a fishing tackle box constructed according to the invention.
Figure 2:
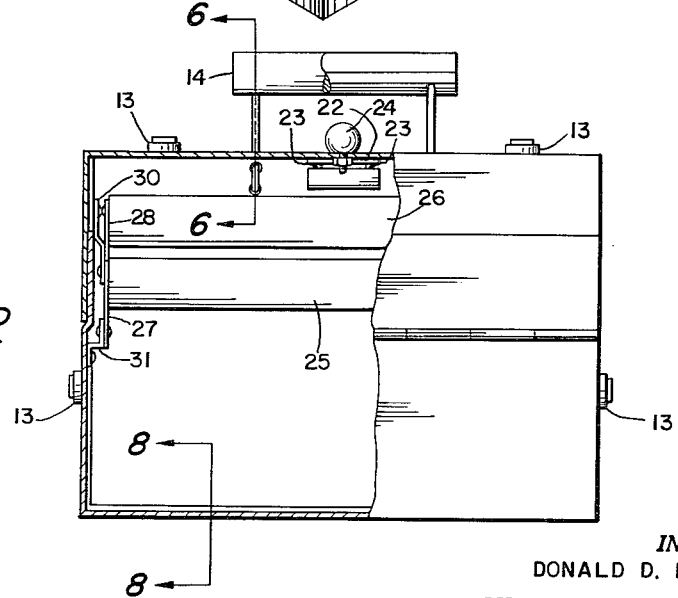
FIGURE 2 is a side elevation of the tackle box, partially in section, taken along the line 2—2 of FIG. 1.
Figure 3:
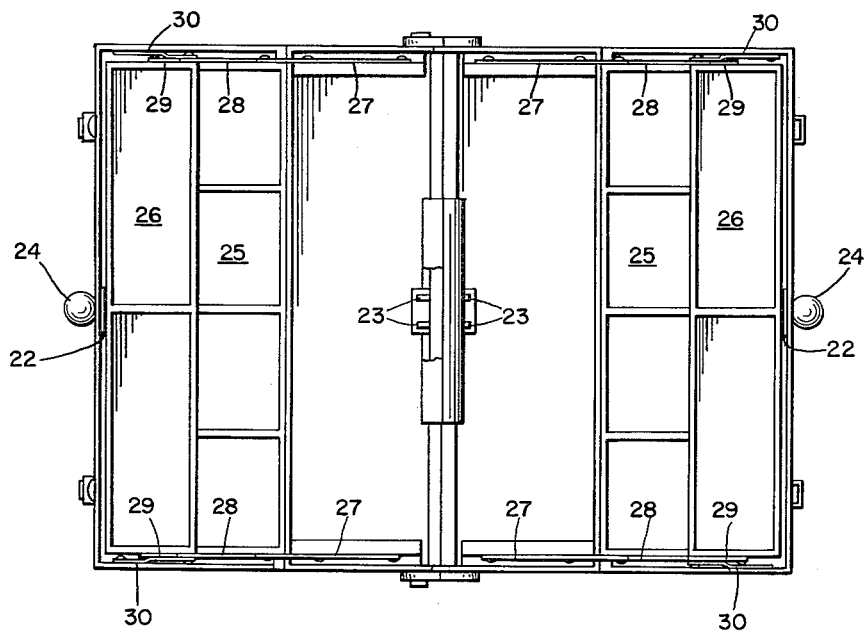
FIGURE 3 is a top elevational view of the tackle box shown in FIG. 1, but showing the covers of the box sections open.
Figure 4:
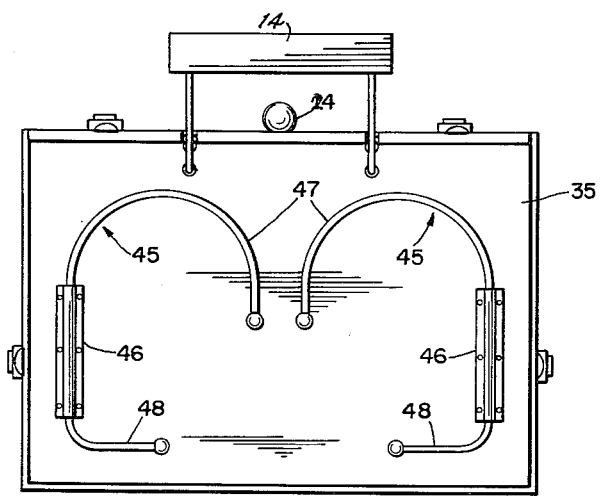
FIGURE 4 is an elevational view of the inner wall of one section of the tackle box.

Referring now to the drawings, there is shown a two part combination tackle box 10 constructed according to my invention which is formed from metal, plastic, fiberglass or other suitable material. The box is comprised generally of two individually usable sections 11 and 12, which are detachably connected together by suitable clasps 13. A handle 15 is provided for carrying the assembled sections and which, in the illustrated embodiment, is formed from a pair of semi-cylindrical bars 14 mounted on each section.

The two box sections or units 11 and 12 are each provided with a cover 20 hinged to its outer wall 21. Any suitable means may be provided for holding the covers shut, and such means may take the form of a magnet 22 secured to an inner edge of each cover 20 and a co-operating magnet 23 mounted on each box section 11 and 12. Knobs 24 are provided so that the magnets can be detached from each other and the cover swung into an open position.

Each box section has mounted therein superposed trays 25 and 26 which may be used to hold fishing tackle and other fishing equipment. A linkage means is provided between the trays and box sections so that the trays can be swung outwardly as the cover is opened so as to provide ready access to the bottom of each box section. This linkage means includes a pair of links 27 pivotally connected at one end to the outer ends of tray 25 at its innermost edge, and at the other ends to the flanges 31 which are joined to the end walls of the box sections. Links 28 are pivotally connected to the flange 31, the outer ends of tray 26, and to an intermediate portion of the outer end of tray 25. A third link 29 is pivotally connected between the outer ends of trays 25 and 26. These links are arranged in substantial parallel alignment so that the trays 25 and 26 will at all times be horizontal. Additional links 30 are connected at one end to the outer end walls of the covers 20 and to the outer ends of the trays 25, these links serving to pull the trays to their outwardly swung position.

Figure 7:
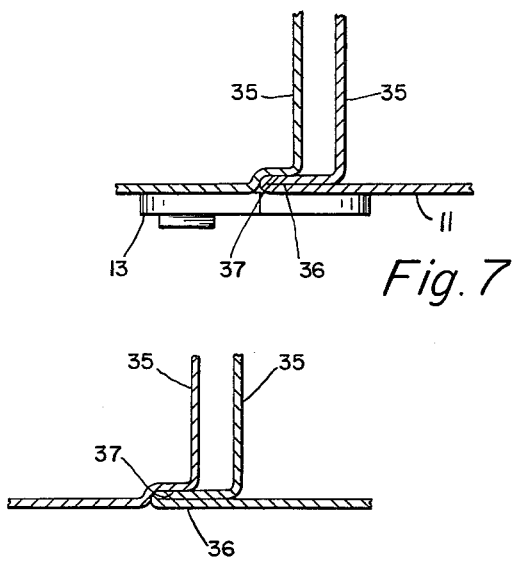
FIGURE 7 is a fragmentary sectional view taken along the line 7—7 of FIG. 1.
Figure 8:
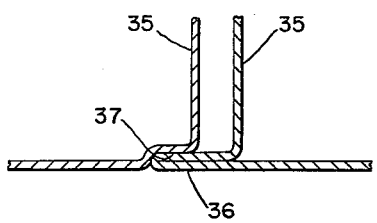
FIGURE 8 is a fragmentary sectional view taken along the line 8—8 of FIG. 2.
Figure 9:
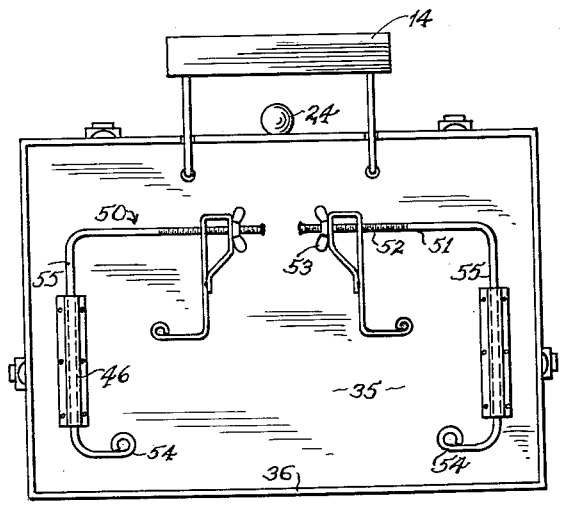
FIGURE 9 is an elevation similar to FIG. 4 showing a modified form of the box section suspending means adapted for adjustably clamping the members onto a support.

The inner walls 35 of sections 11 and 12 are constructed so that the inner walls will be in spaced alignment when the sections are clasped together, and are formed so that the assembled sections 11 and 12 cannot move relative to each other. This construction includes a folded lip 36 extending around the outer ends and bottom of the inner wall 35 of box section 11. A corresponding recess 37 is formed around the outer ends and bottom of the inner wall of the box section 12. The thickness of the lip 36 and the depth of the recess 37 are such that the ends and bottom of the box section will be coplanar, as shown most clearly in FIGURES 7 and 8. The lip and recess function to prevent the assembled box sections from sliding relative to each other. Inwardly directed flanges 38 are provided along the top of the inner wall of sections 11 and 12 to assist in spacing the sections from each other. The inner walls 35 additionally include holes 39 which serve to connect the handle support 40.

Figure 5:
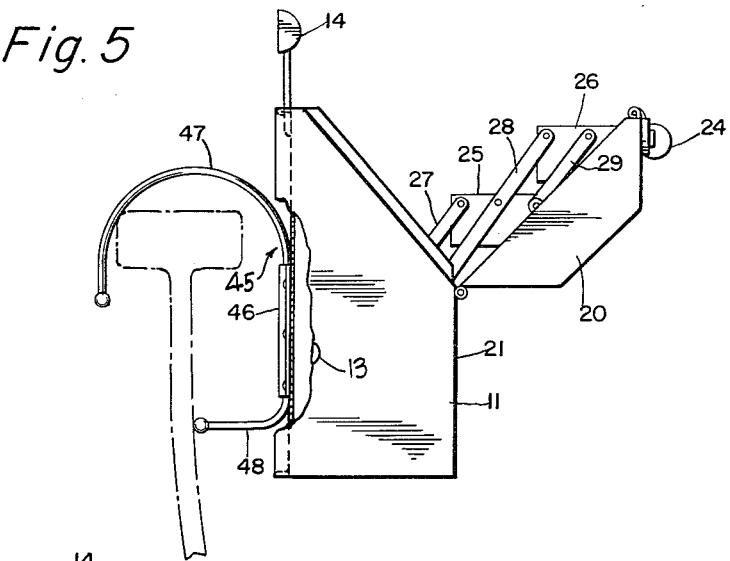
FIGURE 5 is an end elevation of one section of the tackle box, and shows the box mounted on a fragmentary section of a side of a boat.
Figure 6:
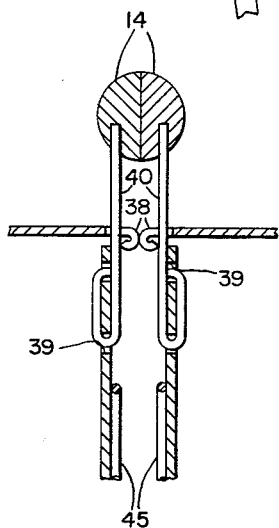
FIGURE 6 is a fragmentary sectional view taken along the line 6—6 of FIG. 2.

Each box section is provided with a suspending and positioning means which can be used to suspend the box sections from the gunnel of a boat. In the illustrated embodiment this suspending and positioning means constitutes a pair of rigid members 45, each member being foldably hinged in brackets 46 attached to the inner walls 35 of each box section. These members 45 include an upper hooked end 47 which is shaped to fit over the "gunnel" at the side of the boat, as shown in FIG. 5, while the bottoms of the members have relatively short horizontal ends 48 which function to space the box sections from the side of the boat and to brace them in a substantially vertical position.

A modified form of the suspending and positioning means is illustrated in FIGS. 9 to 12. As there shown, members corresponding to the supports 45 are designated generally at 50, shown as rigid wire or small rod members having a horizontal portion 51 which may be threaded for a portion of its length, as indicated at 52, to receive a wing nut 53. A vertical portion 55 may be hinged in the bracket elements 45, as above described, while at the lower end the wire is preferably turned to form an eyelet, indicated at 54.

A clamp proper may comprise a narrow stiff metal strip of a width suitable to fit between the adjacent walls 35—35 when the box sections are clamped together. The strip is shown as having a straight vertical portion 60, bent to form a bridge member 61, a portion 62 spaced from the member 60, and then turned inwardly as at 63 and welded or secured as at 64 to the member 60, while its lower end is turned inwardly and provided with the curled end 65. The portions 60 and 62 are provided with openings embracing the threads at 52 and sliding therealong while holding its position with relation to the element 50 in any adjusted position in which it may be held by the wing nut 53.

Figure 10:
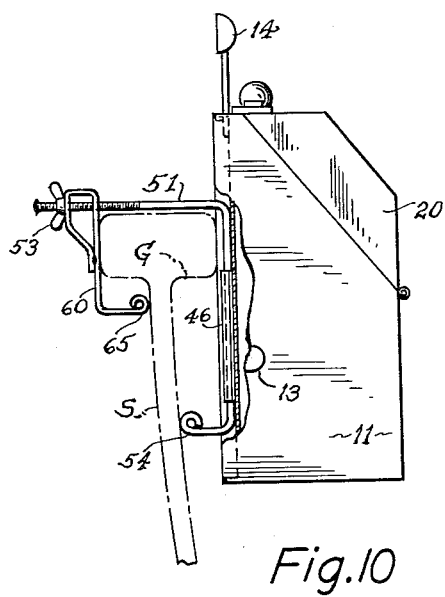
FIGURE 10 is an end elevation, similar to FIG. 5, showing the clamping and suspending means in operative position.
Figure 11:
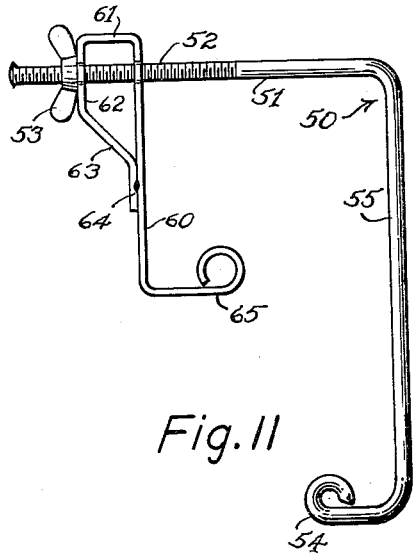
FIGURE 11 is a side view of the suspending and clamping means.
Figure 12:
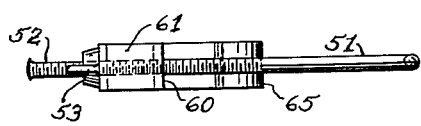
FIGURE 12 is a top plan view of the suspending and clamping means, shown in substantially full scale.

FIG. 10 illustrates the gunnel G at the side S of a boat, where the parts are in a supporting position with the gunnel clamped between the portions 55 and 60 of the clamping member, while the horizontal reach 51 may rest on the top thereof.

When being transported or otherwise carried the box sections 11 and 12 can be fastened together by the clasps 13 thereby providing a unitary and easily handled fishing tackle box. Alternatively, if it is only desired to use one section, the sections can be unclasped and carried individually by the handle sections 14. It will be noted that because of the spaced alignment of the vertical inner walls 35 of the box section, the members 45 can be swung against the inner walls when the box sections are assembled. When being used in a boat, it is only necessary to swing the suspending and positioning means 45 into the position shown in FIG. 5 so that the box sections can be suspended from the gunnel of a boat and held in a vertical plane.

The novel characteristics of this invention, namely, a composite container unit formed from separable sections capable of individual use, may be obviously utilized in many types of carrying cases having multiple accessible compartments other than fishing tackle boxes. It will also be apparent to those skilled in the art that the invention is subject to many variations and modifications in light of the above teachings. It is, therefore, to be understood that the invention is not limited to fishing tackle boxes and that, within the scope of the appended claims, the invention can be practiced otherwise than as specifically shown and described.

What is claimed is:

1. A fishing tackle box comprising a pair of symmetrical box sections, each of said box sections constituting an individual container, a hinged cover on each of said box sections, a tray in each box section, linkage means connecting the tray to the end walls and cover of each box section whereby said tray will be swung outwardly to expose the bottom of said box section when said cover is opened, clasps on each box section for detachably joining said box sections to form a single unitary box, a folded lip extending around the sides and bottom of a wall of one box section, a recess extending around the sides and bottom of a corresponding wall on the other of said box sections, and inwardly directed flanges along the top of each of said walls whereby said walls will be in spaced vertical alignment when said box sections are detachably connected together and whereby relative movement of said assembled box sections will be prevented, suspending and positioning means foldably hinged to each of said walls so that said suspending and positioning means can be folded against said walls when said box sections are assembled and whereby said suspending and positioning means can be swung outwardly when said box sections are disassembled, said suspending and positioning means including relatively rigid members having hooked ends for suspending said box sections individually from the gunnel of a boat and relatively short horizontal ends for positioning and holding said suspended box sections in a vertical plane spaced from the curved sides of the boat.

2. A fishing tackle box comprising a pair of symmetrical box sections, each of said sections constituting an individual container adapted to be used separately of the other, means on each box section for detachably connecting said sections together to form a single box unit, locating and aligning means on at least two sides of a corresponding wall of each box section for aligning said box sections when they are assembled to form a symmetrical structure with said corresponding walls being in spaced vertical alignment, said locating and aligning means including a folded lip extending around the ends and bottom of one of said walls and a recess extending around the sides and bottom of the other corresponding wall for receiving said lip, suspending and positioning means foldably hinged to said walls whereby said suspending and positioning means can be folded against said walls when said box sections are assembled and whereby said suspending and positioning means can be swung away from said corresponding walls when said box sections are disassembled to suspend each box section independent of the other from a gunnel of a boat and to position said box sections in a vertical plane spaced from the curved sides of a boat.

References Cited in the file of this patent

UNITED STATES PATENTS

| | | |
|---|---|---|
| 253,975 | Carpenter | Feb. 21, 1882 |
| 775,343 | Anderson | Nov. 22, 1904 |
| 900,373 | Hunter | Oct. 6, 1908 |
| 1,734,352 | Smith | Nov. 5, 1929 |
| 1,893,527 | Shriver | Jan. 10, 1933 |
| 2,316,833 | Baron | Apr. 20, 1943 |
| 2,405,744 | Glass | Aug. 13, 1946 |
| 2,495,132 | Remco | Jan. 17, 1950 |
| 2,588,957 | Brown | Mar. 11, 1952 |